Patented Dec. 2, 1941

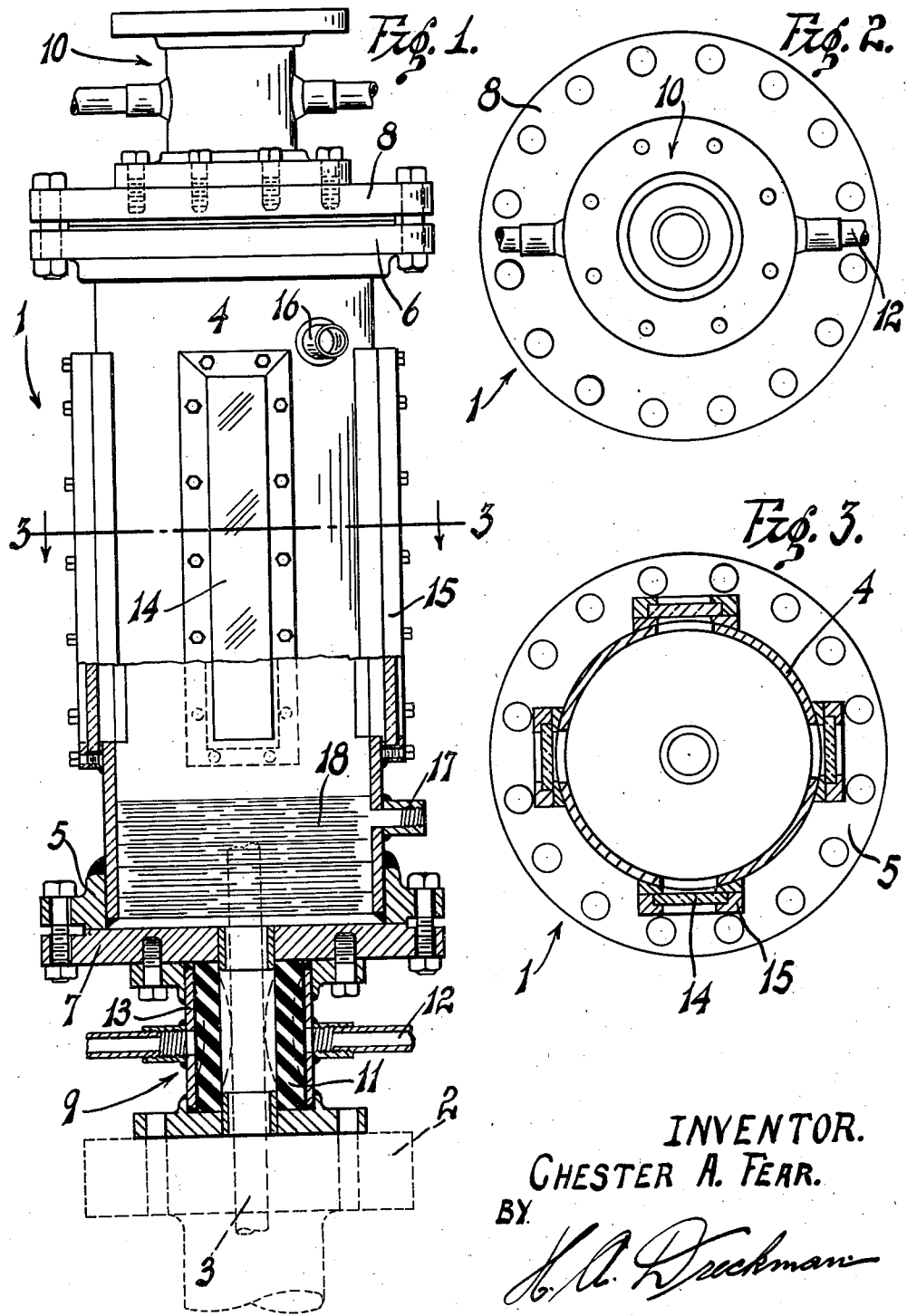
Dec. 2, 1941.  C. A. FEAR  2,264,515
CONTINUOUS FEED PIPE JOINT TESTER
Filed May 17, 1939
INVENTOR.
CHESTER A. FEAR.
BY
ATTORNEY.

2,264,515

UNITED STATES PATENT OFFICE 2,264,515

CONTINUOUS FEED PIPE JOINT TESTER

Chester A. Fear, Long Beach, Calif.

Application May 17, 1939, Serial No. 274,176

2 Claims. (Cl. 73—51)

This invention relates to a pipe joint tester, and particularly for those pipes which are used in wells such as oil or gas wells, and the prime object of my invention is to provide a pipe joint tester in which the pipe may be continuously moved through the tester as the pipe is transferred into or out of a well.

Another object of my invention is to provide a novel pipe joint tester adapted to be mounted directly over a well, the pipe to be tested extending through the tester, and novel means being provided to pack off both ends of the tester to prevent leakage around the pipe as the pipe is moved therethrough.

A further object is to provide a novel pipe joint tester of the character stated, which is simple in construction, effective in operation, and which is provided with means to observe the pipe as it passes through the tester, thus determining whether there are leaks at the joints or elsewhere throughout the length of the pipe.

Other objects, advantages and features of invention may appear from the accompanying drawing, the subjoined detailed description, and the appended claims.

In the drawing:

Figure 1 is a side elevation of my improved pipe joint tester, with parts broken away to show interior construction.

Figure 2 is a top plan view of my joint tester.

Figure 3 is a sectional view taken on line 3—3 of Figure 1.

Referring more particularly to the drawing, the numeral 1 indicates a pipe joint tester, which is mounted on or immediately above the casing head 2 and in alignment with the casing, so that the pipe 3 to be tested may be moved out of or into the well, and simultaneously through the tester 1, as will be apparent from the subsequent description. It is understood that the pipe 3 is made up of a plurality of sections, each section being screwed into a connecting collar, and provision is made in my invention to enable these collars, as well as the pipe itself, to pass readily through the tester. The most frequent point of leakage in a length of pipe is at or in the collars, and, therefore, these must be particularly observed to discover leaks.

The pipe tester 1 comprises a substantially cylindrical body 4, on each end of which a head 5 and 6 is provided. These heads may be integrally formed with the body or may be welded to the body, as shown in the drawing. A plate 7 is bolted to the head 5 and a plate 8 is bolted to the head 6. A pack-off fitting 9 is fixedly attached to the plate 7, and a pack-off fitting 10, of identical construction to the fitting 9, is fixedly attached to the plate 8. These fittings each include a yieldable packing 11, which engages the pipe 3, with sufficient force to prevent leakage at the top and bottom of the tester. The packing 11 is preferably rubber although other yieldable material may be used, if desired. This packing is preferably forced inwardly against the tested pipe by means of air or fluid pressure, which is introduced through pipes 12, these pipes extending through the cylindrical wall 13 of the fitting, thus pressing the packing 11 inwardly, as shown in dotted lines in Figure 1. The packing 11 is sufficiently yieldable so that the collars of the tested pipe can readily pass through it. The fitting 9 is preferably bolted or otherwise secured to the casing head 2, thus mounting the tester in axial alignment with the casing, or with the bore of the well.

A plurality of transparent windows 14 are provided in the body 4, and these windows are preferably mounted in frames 15, which frames are securely attached to the body and suitable packing or sealing means is provided to prevent leakage. A coupling 16 is provided in the body 4 adjacent its upper end, and a pressure or vacuum pump is connected to this coupling, whereby either pressure or vacuum may be applied to the inside of the housing. An outlet coupling 17 permits the housing to be exhausted or returned to normal atmospheric pressure when not in use.

A quantity of liquid 18, such as oil, soapy water, or the like, is provided in the lower part of the housing 4, and the tested pipe as it moves out of the well passes through the liquid and becomes coated. Any leaks in the pipe are then evidenced by bubbles in the liquid which coats the pipe.

Having described my invention, I claim:

1. A pipe tester for testing continuous lengths of pipe comprising a hollow body, said body having openings in each end thereof, packing means on the body aligned with said openings, and with each other, and engageable with pipe to be tested, a coupling in the body through which said body may be evacuated or pressure exerted therein, and a transparent window in the body wall through which the tested pipe may be observed.

2. A pipe tester for testing continuous lengths of pipe comprising a hollow cylindrical body, a fitting mounted on the top and bottom of the body, each of said fittings having an opening therein, annular packing in both of the fittings, said packing being aligned with the openings in the fittings, and with each other, a coupling in the body through which said body may be evacuated or pressure exerted therein, and a transparent window in the body wall through which the tested pipe may be observed.

CHESTER A. FEAR.